(12) United States Patent
Filipczak et al.

(10) Patent No.: US 11,938,792 B2
(45) Date of Patent: Mar. 26, 2024

(54) HIDDEN DOOR SEAL FOR VEHICLE

(71) Applicant: GM GLOBAL TECHNOLOGY OPERATIONS LLC, Detroit, MI (US)

(72) Inventors: Larry Filipczak, West Bloomfield, MI (US); Shayne Jerome Bigelow, Royal Oak, MI (US); Scott Yaroch, Dryden, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/848,729

(22) Filed: Jun. 24, 2022

(65) Prior Publication Data
US 2023/0415554 A1 Dec. 28, 2023

(51) Int. Cl.
*B60J 10/75* (2016.01)
(52) U.S. Cl.
CPC .................................... *B60J 10/75* (2016.02)
(58) Field of Classification Search
CPC .................................. B60J 10/75; B60J 10/24
See application file for complete search history.

(56) References Cited

U.S. PATENT DOCUMENTS

| | | | | |
|---|---|---|---|---|
| 5,463,831 A | * | 11/1995 | Shinagawa | B60J 10/75 49/377 |
| 8,898,958 B2 | * | 12/2014 | Filipczak | B60J 10/78 49/502 |
| 2013/0154302 A1 | * | 6/2013 | Kim | B60J 10/24 296/93 |
| 2013/0312330 A1 | * | 11/2013 | Sturgell | B60J 10/75 49/70 |
| 2019/0061503 A1 | * | 2/2019 | Filipczak | B60J 1/2097 |

FOREIGN PATENT DOCUMENTS

EP 3489056 A1 * 5/2019 ............ B60J 10/248

* cited by examiner

*Primary Examiner* — Janet M Wilkens
*Assistant Examiner* — Susan M. Heschel
(74) *Attorney, Agent, or Firm* — CANTOR COLBURN LLP

(57) ABSTRACT

A door molding for a door of a vehicle includes a main body securable to a door panel, and a bulb portion extending from the main body. The bulb portion includes a first bulb portion extending from the main body to a bulb peak. The first bulb portion is configured to contact a door glass of the door. A second bulb portion extends from the bulb peak to the main body. The second bulb portion includes a first contact area configured to contact a first location of the door panel, a second contact area configured to contact a second location of the door panel, and a hinge portion connecting the first contact area to the second contact area.

17 Claims, 6 Drawing Sheets

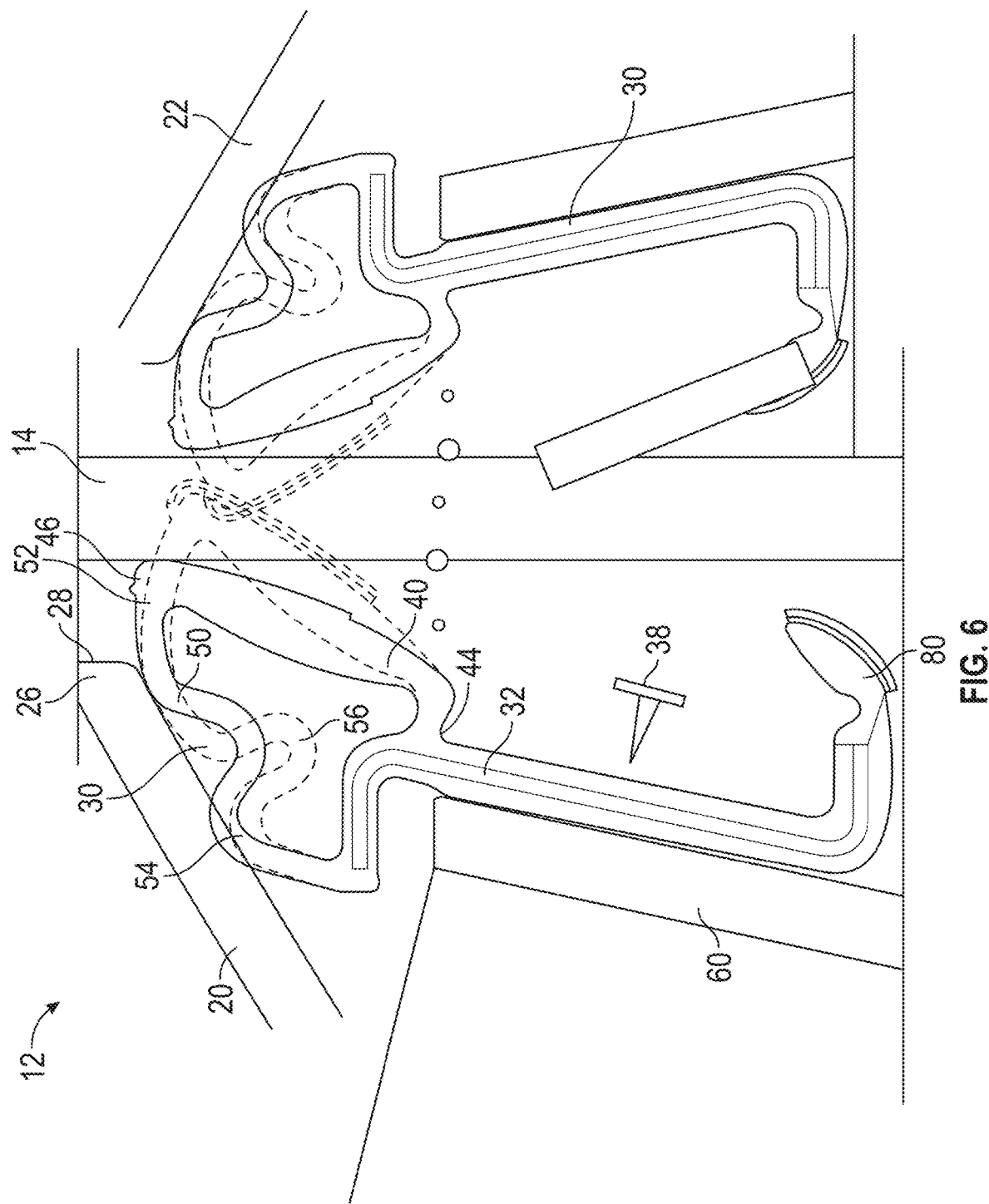

HIDDEN DOOR SEAL FOR VEHICLE

INTRODUCTION

The subject disclosure relates to door assemblies for vehicles, and in particular to outer belt moldings for vehicle door assemblies.

Door assemblies of vehicles typically utilize an outer belt molding that is attached to a flange of the outer door panel and includes a sealing lip that is configured to provide a seal between the outer door panel and the door glass. Vehicle designs are trending toward configurations where the outer belt molding is hidden, or not visible to an observer. In such configurations, the outer belt molding is located vertically below a topmost edge of the outer door panel to hide the outer belt molding from view. These outer belt moldings are often installed via pushpin fasteners, which have relatively poor retention, and also include a relatively long sealing lip, which may be relatively weak due at least in part to its length and have poor long term load loss properties. Further, such seals often have an open cross-section, which creates a large trap for ice, dirt and debris. It is desired to provide a hidden outer belt molding having improved retention and robustness, while reducing intrusion of debris, dirt and ice into the door assembly. Bulb seals also have better noise insulation properties because bulb seals seal both sides of an opening with an air gap between which improves trapping or stopping noise transmission.

SUMMARY

In one embodiment, a door molding for a door of a vehicle includes a main body securable to a door panel, and a bulb portion extending from the main body. The bulb portion includes a first bulb portion extending from the main body to a bulb peak. The first bulb portion is configured to contact a door glass of the door. A second bulb portion extends from the bulb peak to the main body. The second bulb portion includes a first contact area configured to contact a first location of the door panel, a second contact area configured to contact a second location of the door panel, and a hinge portion connecting the first contact area to the second contact area.

Additionally or alternatively, in this or other embodiments a base hinge connects the main body to the first bulb portion.

Additionally or alternatively, in this or other embodiments a U-shaped carrier feature of the main body connects the door molding to the door panel.

Additionally or alternatively, in this or other embodiments the door molding is connected to the door panel via one or more screws or clips.

Additionally or alternatively, in this or other embodiments a secondary seal arm extends from the main body and is configured to contact the door glass in an opened position.

Additionally or alternatively, in this or other embodiments the bulb portion is tunable via varying a material thickness of the hinge portion.

Additionally or alternatively, in this or other embodiments the bulb portion has a hollow cross-section.

In another embodiment, a door assembly of a vehicle includes a door body, a door glass movable between a closed position and an opened position, and a door molding secured to the door body and configured to seal between the door glass and the door body. The door molding includes a main body securable to the door body, and a bulb portion extending from the main body. The bulb portion includes a first bulb portion extending from the main body to a bulb peak. The first bulb portion is configured to contact the door glass. A second bulb portion extends from the bulb peak to the main body. The second bulb portion includes a first contact area configured to contact a first location of the door body and a second contact area configured to contact a second location of the door body. A hinge portion connects the first contact area to the second contact area.

Additionally or alternatively, in this or other embodiments a base hinge connects the main body to the first bulb portion.

Additionally or alternatively, in this or other embodiments a U-shaped carrier feature of the main body connects the door molding to the door body.

Additionally or alternatively, in this or other embodiments the carrier feature is installed to an outer panel bracket of the door body.

Additionally or alternatively, in this or other embodiments the door molding is connected to the door body via one or more screws or clips.

Additionally or alternatively, in this or other embodiments a secondary seal arm extends from the main body configured to contact the door glass in an opened position.

Additionally or alternatively, in this or other embodiments the first contact area is at a hem location of a door outer panel and a door stiffener.

Additionally or alternatively, in this or other embodiments the bulb portion is tunable via varying a material thickness of the hinge portion.

Additionally or alternatively, in this or other embodiments the bulb portion has a hollow cross-section.

Additionally or alternatively, in this or other embodiments the door molding is installed vertically below an upper vertical edge of the door body.

In yet another embodiment, an installation tool for a door molding of a door body of a vehicle includes a tool locating arm configured to locate the installation tool relative to an upper vertical edge of the door body, and a support arm extending from the tool locating arm. The support arm is configured to locate the door molding relative to the upper vertical edge.

Additionally or alternatively, in this or other embodiments the tool locating arm and the support arm are connected by a tool pivot.

Additionally or alternatively, in this or other embodiments a tool bumper extends from the support arm to urge the support arm toward the door body.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 6 is yet another cross-sectional view of an embodiment of a vehicle door taken at 3-3.

DETAILED DESCRIPTION

Figure 1:
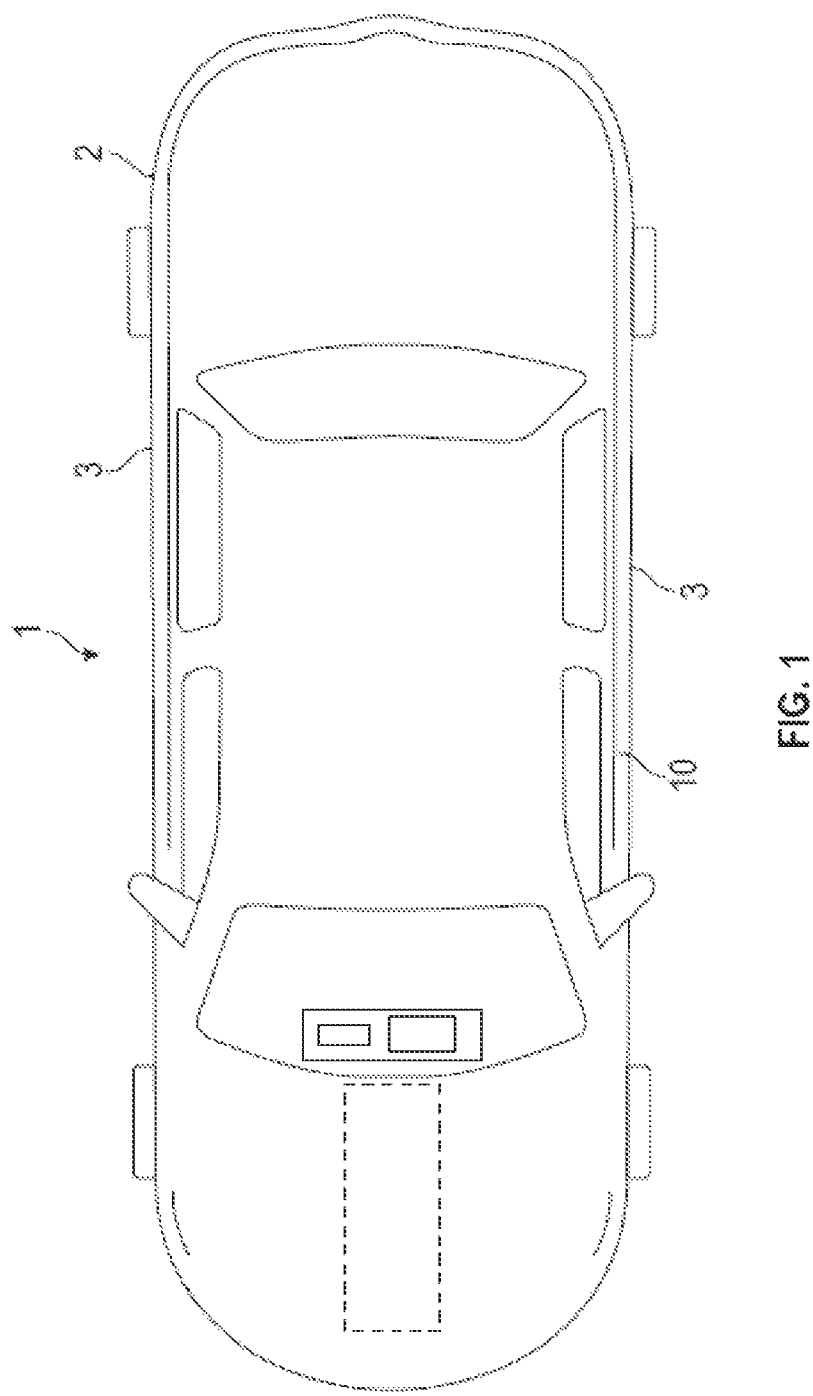
FIG. 1 is an illustration of an embodiment of a vehicle.

The following description is merely exemplary in nature and is not intended to limit the present disclosure, its application or uses. It should be understood that throughout the drawings, corresponding reference numerals indicate like or corresponding parts and features.

In accordance with an exemplary embodiment, a plan view of an embodiment of a vehicle 1 is illustrated in FIG. 1. The vehicle 1 includes a vehicle body 2, which includes one or more door assemblies 10 that in some embodiments are located generally at a lateral sides 3 of the vehicle body 2. While the present disclosure is described in the context of a door assembly 10, one skilled in the art will readily appreciate that the present disclosure may be utilized at, for example, vehicle liftgate/hatch/mid-gate assemblies with movable glass, backlights, or rear windows.

Figure 2:
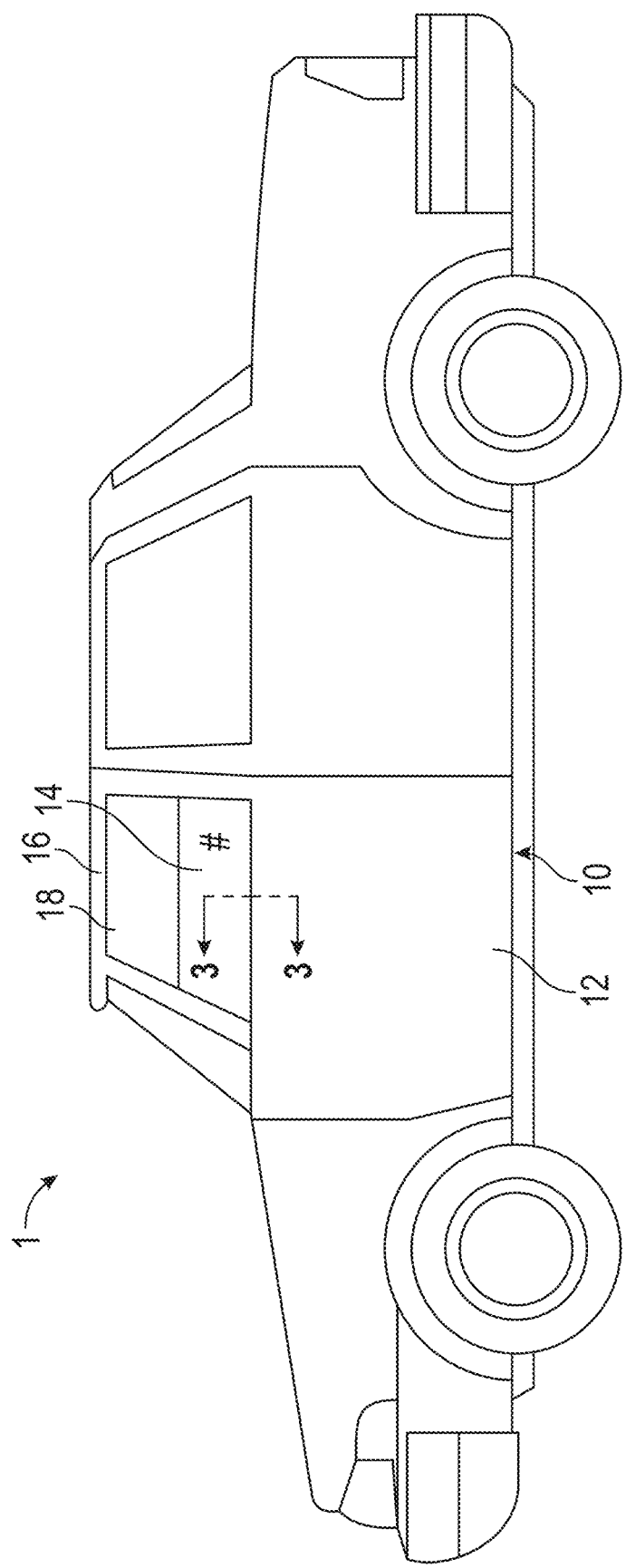
FIG. 2 is an illustration of an embodiment of a vehicle door.

In accordance with an exemplary embodiment, illustrated in FIG. 2 is an exemplary embodiment of a door assembly 10. The door assembly 10 includes a door body 12 and a door glass 14, which is movable between an opened and closed position. In some embodiments, the door assembly 10 includes a door frame 16 secured to the door body 12, which defines a window opening 18 of the door assembly 10. In some embodiments, the door frame 16 is a guide for travel of the door glass 14 between the opened and closed position.

Figure 3:
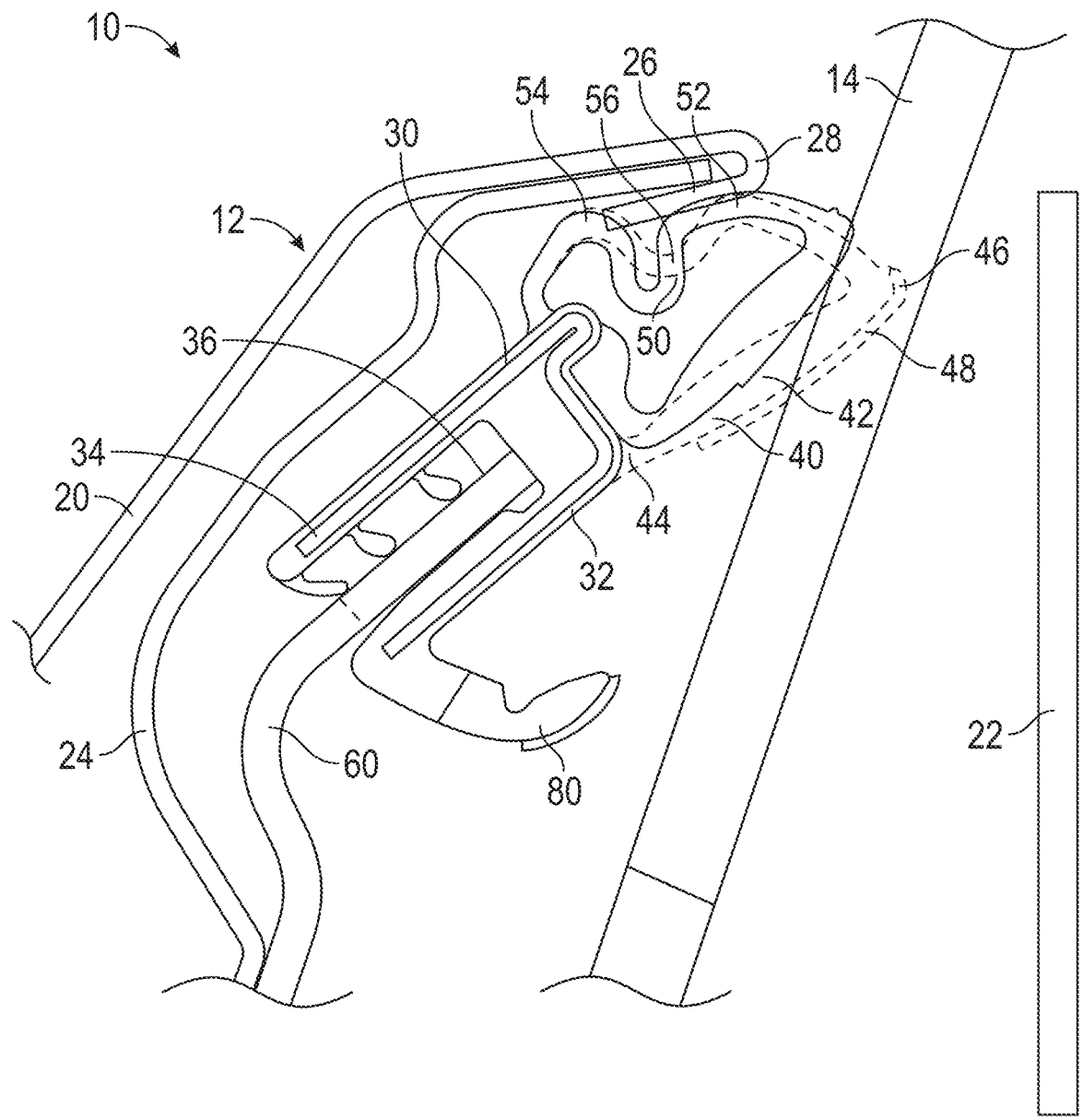
FIG. 3 is a cross-sectional view of an embodiment of a vehicle door taken at 3-3.

Referring now to the cross-sectional view of FIG. 3, the door body 12 includes a door outer panel 20 defining an exterior of the door assembly 10, and a door inner panel 22 spaced apart from the door outer panel 20, with the door glass 14 located between the door outer panel 20 and the door inner panel 22. In some embodiments, the door outer panel 20 is secured to a panel stiffener 24 via, for example, a door hem 26, which defines a vertically upper edge 28 of the door outer panel 20. A door molding 30, also referred to as an outer belt molding is positioned between the door outer panel 20 and the door glass 14. The door molding 30 provides sealing between the door outer panel 20 and the door glass 14, and prevents debris such as water, ice, dirt and other material from entering the door body 12 between the door outer panel 20 and the door glass 14. FIG. 3 illustrates the door molding 30 in both a free state, shown in phantom lines, and a deployed state abutting the door glass 14, shown in solid lines.

Figure 4:
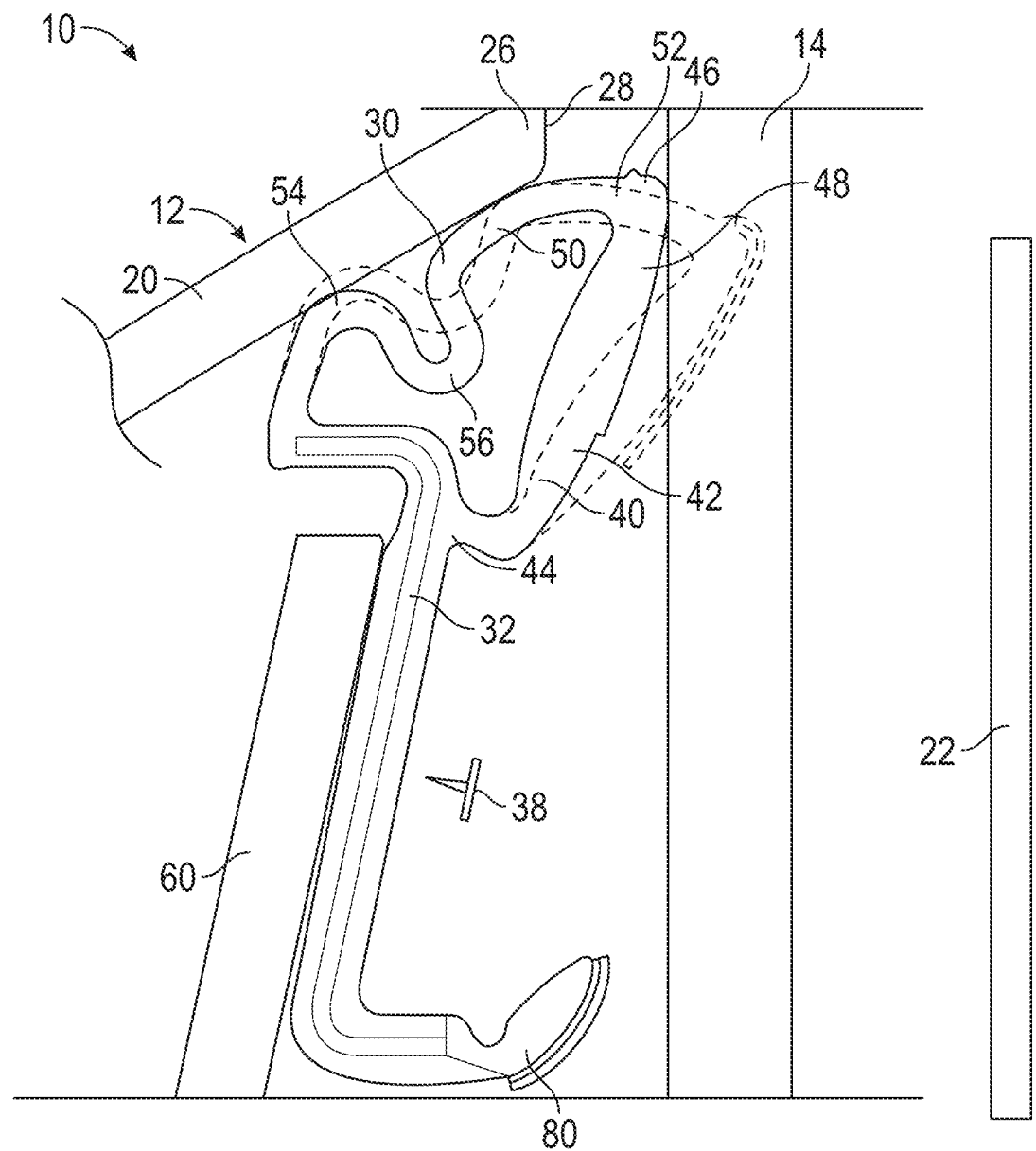
FIG. 4 is another cross-sectional view of an embodiment of a vehicle door taken at 3-3.

The door molding 30 includes a main body 32, which includes features to secure the door molding 30 to the door assembly 10, for example, to an outer panel bracket 60 connected to the door outer panel 20. In the embodiment of FIG. 3, the main body 32 includes a U-shaped carrier feature 34 which is installed over a panel edge 36 of the outer panel bracket 60 to secure the door molding 30 to the door assembly 10. Additionally, adhesive may be utilized in installation of the door molding 30 to the door assembly 10. In other embodiments, such as shown in FIG. 4, one or more fasteners such as screws 38 or clips may be installed into the door molding 30 to secure the door molding 30 to the outer panel bracket 60. It is to be appreciated that these configurations are merely exemplary and that other attachment features may be utilized to secure the door molding 30 to the outer panel bracket 60. Further, while in the embodiments of FIG. 3 and FIG. 4 the door molding 30 is positioned between the door glass 14 and the door outer panel 20, in the embodiment of FIG. 6 the door molding 30 may be located between the door glass 14 and the door inner panel 22. FIGS. 4 and 6 also illustrate the door molding 30 in both a free state, shown in phantom lines, and a deployed state abutting the door glass 14, shown in solid lines.

Referring again to FIG. 3, the door molding 30 includes a bulb portion 40 extending from the main body 32. The bulb portion 40 is a closed cross-section which in some embodiments is hollow and, may be movable or flexible relative to the main body 32. While a closed cross-section is illustrated in FIG. 3 and described herein, on other embodiments the cross-section may be semi-closed. The bulb portion 40 is configured to contact the door glass 14 and further is configured to contact the door outer panel 20 to provide a seal thereat and prevent intrusion of water and other debris into an interior of the door assembly 10 between the door glass 14 and the door outer panel 20. Such a feature further reduces wind noise in the door assembly 10 during operation and travel of the vehicle 1. In some embodiments, the bulb portion 40 is formed from, for example, thermoplastic vulcanisate (TPV) or ethylene propylene diene monomer (EPDM).

The bulb portion 40 includes a first bulb portion 42 extending from the main body 32 between the main body 32 and the door glass 14. The first bulb portion 42 is movable or flexible relative to the main body 32 about a first bulb pivot 44, where the first bulb portion 42 is connected to the main body 32. The first bulb portion 42 extends to a bulb peak 46 and, contacts the door glass 14 at one or more glass contact areas 48 along the first bulb portion 42 between the first bulb pivot 44 and the bulb peak 46. A second bulb portion 50 extends from the bulb peak 46 to the main body 32 between the first bulb portion 40 and the door outer panel 20 and contacts the door outer panel 20 and/or the panel stiffener 24 to provide a seal thereat.

The second bulb portion 50 includes a first contact portion 52 and a second contact portion 54, with a bulb hinge 56 located between the first contact portion 52 and the second contact portion 54. The first contact portion 52 contacts the door outer panel 20 at or near the door hem 26, for water and wind noise management. The first contact portion 52 is tunable by, for example, changing a material thickness of the first contact portion 52 to provide the desired amount of contact/sealing at the door outer panel 20 and also to ensure a desired contact force of the first bulb portion 40 on the door glass 14. The second contact portion 54 acts as a redundant seal and contacts the door outer panel 20 vertically below the first contact portion 52 to further prevent water, debris, and wind intrusion into the door assembly 10. The bulb hinge 56 is, in some embodiments, U-shaped and may be constructed as a localized thinning of the second bulb portion 50 which allows for independent relative movement of the first contact portion 52 and the second contact portion 54 so that a desired level of sealing is achieved at both the first contact portion 52 and the second contact portion 54. Additionally, in some embodiments the door molding 30 includes a secondary seal arm 80 extending from the main body 32 toward the door glass 14. The secondary seal arm 80 is configured to contact the door glass 14 when the door glass 14 is in an opened position to prevent vibration of the door glass 14 when in the open position.

Figure 5:
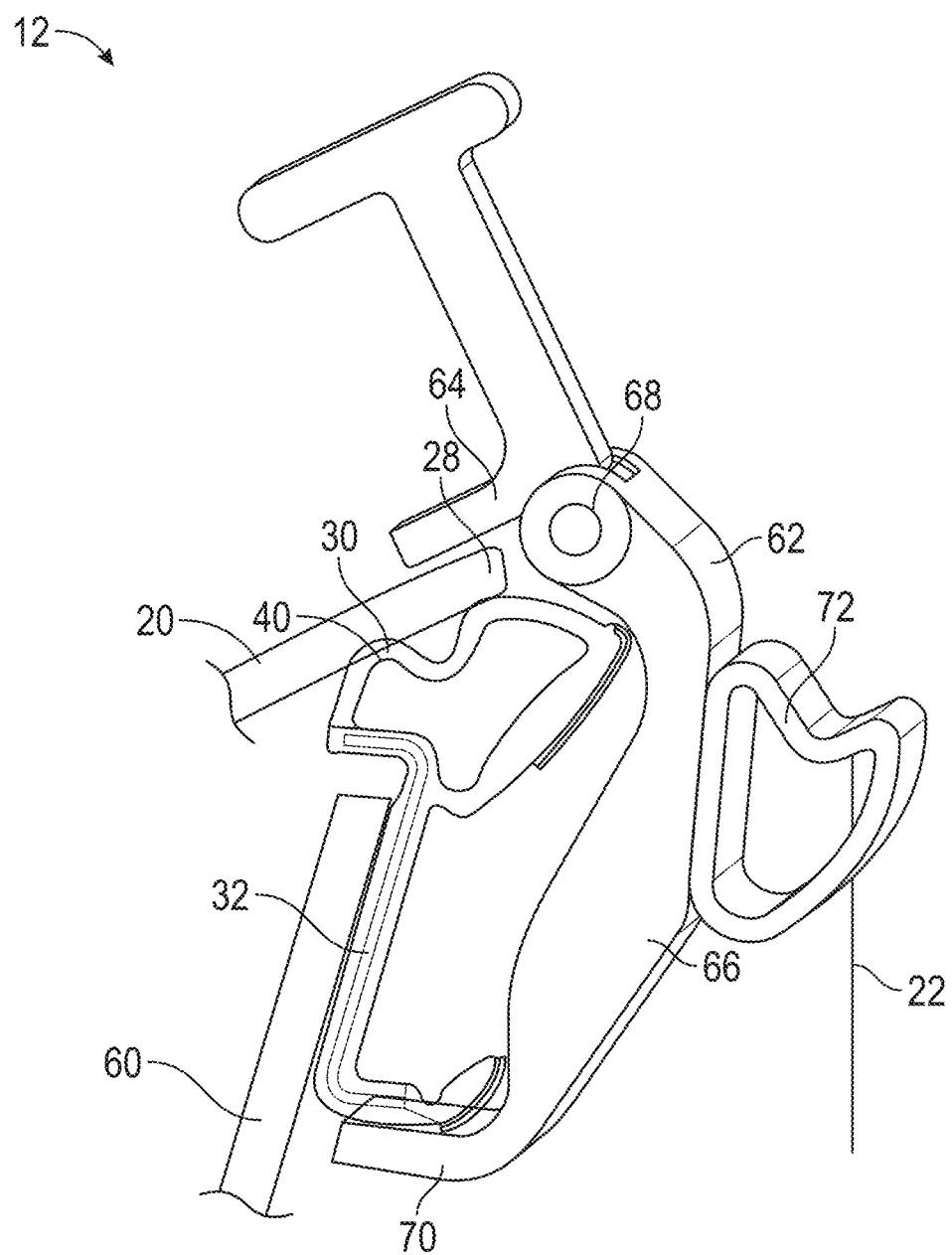
FIG. 5 is a cross-sectional view of a vehicle door and door molding installation tool.

FIG. 5 illustrates an installation tool 62 utilized to install the door molding 30 to the door assembly 10. The installation tool 62 includes a tool locating feature, such as a tool arm 64 to locate the installation tool 62 relative to the vertically upper edge 28 of the door outer panel 20. In some embodiments the tool arm 64 rests on the vertically upper edge 28. The installation tool 62 further includes a support arm 66 which locates and supports the door molding 30 for installation. In some embodiments, the support arm 66 is connected to the locating arm 64 via a pivot 68. The support arm 66 includes a molding locator 70 along the support arm 66, and the door molding 30 rests on the molding locator 70 to vertically locate the door molding 30 for installation via the screws 38 (shown in FIG. 4). In some embodiments, the installation tool 62 includes a tool bumper 72 on the support arm 66. The tool bumper 72 contacts the door inner panel 22, urging the installation tool 62 toward the outer panel bracket 60.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A door molding for a door of a vehicle, comprising:
   a main body securable to a door panel;
   a bulb portion extending from the main body, the bulb portion including:
   a first bulb portion extending from the main body to a bulb peak, the first bulb portion configured to contact a door glass of the door;
   a second bulb portion extending from the bulb peak to the main body, the second bulb portion including:
   a first contact area configured to directly contact a first location of the door panel;
   a second contact area configured to directly contact a second location of the door panel; and
   a hinge portion connecting the first contact area to the second contact area.

2. The door molding of claim 1, further comprising a base hinge connecting the main body to the first bulb portion.

3. The door molding of claim 1, further comprising a U-shaped carrier feature of the main body to connect the door molding to the door panel.

4. The door molding of claim 1, wherein the door molding is connected to the door panel via one or more screws or clips.

5. The door molding of claim 1, further comprising a secondary seal arm extending from the main body configured to contact the door glass in an opened position.

6. The door molding of claim 1, wherein the bulb portion is tunable via varying a material thickness of the hinge portion.

7. The door molding of claim 1, wherein the bulb portion has a hollow cross-section.

8. A door assembly of a vehicle, comprising:
   a door body;
   a door glass movable between a closed position and an opened position;
   a door molding secured to the door body and configured to seal between the door glass and the door body, the door molding including:
   a main body securable to the door body; and
   a bulb portion extending from the main body, the bulb portion including:
   a first bulb portion extending from the main body to a bulb peak, the first bulb portion configured to contact the door glass;
   a second bulb portion extending from the bulb peak to the main body, the second bulb portion including:
   a first contact area configured to directly contact a first location of the door body;
   a second contact area configured to directly contact a second location of the door body; and
   a hinge portion connecting the first contact area to the second contact area.

9. The door assembly of claim 8, further comprising a base hinge connecting the main body to the first bulb portion.

10. The door assembly of claim 8, further comprising a U-shaped carrier feature of the main body to connect the door molding to the door body.

11. The door assembly of claim 10, wherein the carrier feature is installed to an outer panel bracket of the door body.

12. The door assembly of claim 8, wherein the door molding is connected to the door body via one or more screws or clips.

13. The door assembly of claim 8, further comprising a secondary seal arm extending from the main body configured to contact the door glass in an opened position.

14. A door assembly of a vehicle, comprising:
   a door body;
   a door glass movable between a closed position and an opened position;
   a door molding secured to the door body and configured to seal between the door glass and the door body, the door molding including:
   a main body securable to the door body; and
   a bulb portion extending from the main body, the bulb portion including:
   a first bulb portion extending from the main body to a bulb peak, the first bulb portion configured to contact the door glass;
   a second bulb portion extending from the bulb peak to the main body, the second bulb portion including:
   a first contact area configured to contact a first location of the door body;
   a second contact area configured to contact a second location of the door body; and
   a hinge portion connecting the first contact area to the second contact area;
   wherein the first contact area is at a hem location of a door outer panel and a door stiffener.

15. The door assembly of claim 8, wherein the bulb portion is tunable via varying a material thickness of the hinge portion.

16. The door assembly of claim 8, wherein the bulb portion has a hollow cross-section.

17. The door assembly of claim 8, wherein the door molding is installed vertically below an upper vertical edge of the door body.

* * * * *